United States Patent [19]
Fukui et al.

[11] Patent Number: 5,909,423
[45] Date of Patent: Jun. 1, 1999

[54] PHOTO-DETECTION DEVICE USED IN AN OPTICAL PICKUP HEAD FOR DETECTING FOCUSING ERROR SIGNAL

[75] Inventors: Kenji Fukui, Sagamihara; Ricardo Musashi Okamoto, Yokohama, both of Japan

[73] Assignee: Pulstec Industrial Co., Ltd., Hamamatsu, Japan

[21] Appl. No.: 08/441,837

[22] Filed: May 16, 1995

[30] Foreign Application Priority Data

May 16, 1994 [JP] Japan .................................. 6-126771

[51] Int. Cl.⁶ ...................................................... G11B 7/00
[52] U.S. Cl. ...................... 369/109; 369/110; 369/44.23; 369/44.24; 369/112
[58] Field of Search .................... 369/109, 110, 369/44.23, 44.24, 44.12, 112

[56] References Cited

U.S. PATENT DOCUMENTS

| | | | |
|---|---|---|---|
| 4,665,310 | 5/1987 | Heemskerk | 369/44.12 |
| 4,779,943 | 10/1988 | Tatsuno et al. | 359/618 |
| 4,817,074 | 3/1989 | Yamanaka | 369/44.24 |
| 4,929,823 | 5/1990 | Kato et al. | 369/44.12 |
| 4,945,529 | 7/1990 | Ono et al. | 369/44.12 |
| 5,036,185 | 7/1991 | Ando | 369/44.24 |
| 5,122,903 | 6/1992 | Aoyama et al. | 369/109 |
| 5,243,585 | 9/1993 | Hoshino et al. | 369/44.23 |
| 5,353,267 | 10/1994 | Katayama | 369/109 |
| 5,410,529 | 4/1995 | Kurata et al. | 369/109 |
| 5,453,962 | 9/1995 | Fujita et al. | 369/44.23 |
| 5,453,963 | 9/1995 | Katayama et al. | 365/44.23 |
| 5,493,555 | 2/1996 | Kimura et al. | 369/109 |

FOREIGN PATENT DOCUMENTS

| | | |
|---|---|---|
| 63-200328 | 8/1988 | Japan . |
| 1-7336 | 1/1989 | Japan .................................. 369/44.23 |
| 349044 | 3/1991 | Japan ...................... 369/109 |

OTHER PUBLICATIONS

Ono, "Polarizing Holographic Optical Elements for Optical Data Storage", SPIE, vol. 1555 Computer and Optically Generated Holographic Optics (Fourth in a Series)(1991), pp. 177–181.

Sincerbox, "Challenges for the Use of Holographic Elements in Optical Storage", SPIE, vol. 1136 Holographic Optics II: Principles and Applications (1989), pp. 80–91.

Article regarding Mr. Ono.

*Primary Examiner*—Nabil Hindi
*Attorney, Agent, or Firm*—Pillsbury Madison & Sutro LLP

[57] ABSTRACT

There is provided an optical pickup head which can accurately detect a focusing error even when the wavelength of light emitted from a light source varies. A holographic element diffracts a light beam reflected by an optical disk to obtain ±1st-order diffracted light beams, and has a diffracting area formed using a Fresnel zone plate, and a light-shading area for shading the reflected light beam. A photo-detector has four-elements light-receiving areas. The photo-detector detects the ±1st-order diffracted light beams diffracted by the diffracting area and focused by a convex lens, and converts these light beams into electrical signals. The photo-detector is disposed at substantially the middle point between the focal points of the −1st-order diffracted light beams formed by the convex lens. Since the middle point does not move even when the lasing wavelength of a semiconductor laser diode varies, the photo-detector can obtain stable signals.

3 Claims, 12 Drawing Sheets

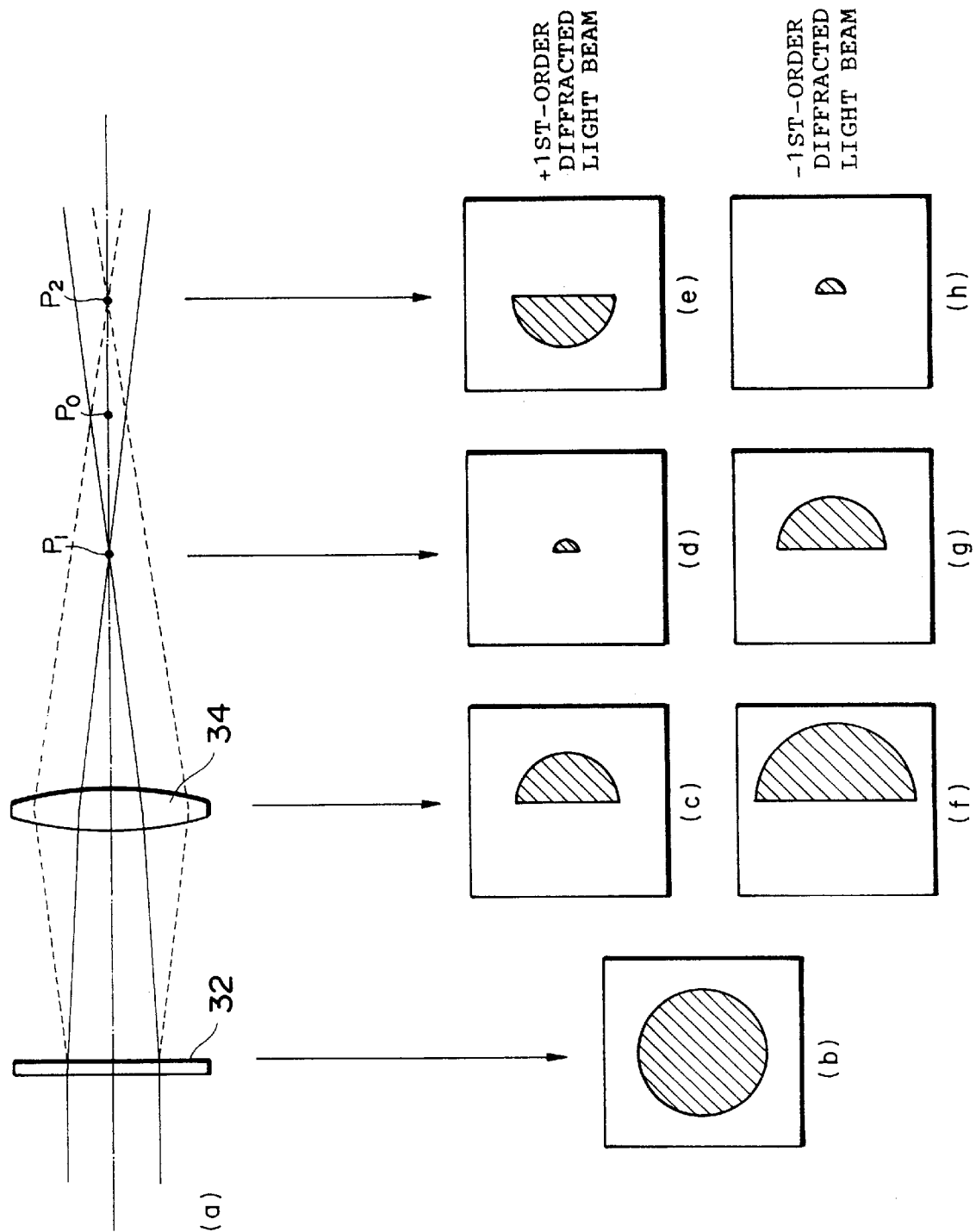

——— +1ST-ORDER DIFFRACTED LIGHT BEAM
- - - - -1ST-ORDER DIFFRACTED LIGHT BEAM

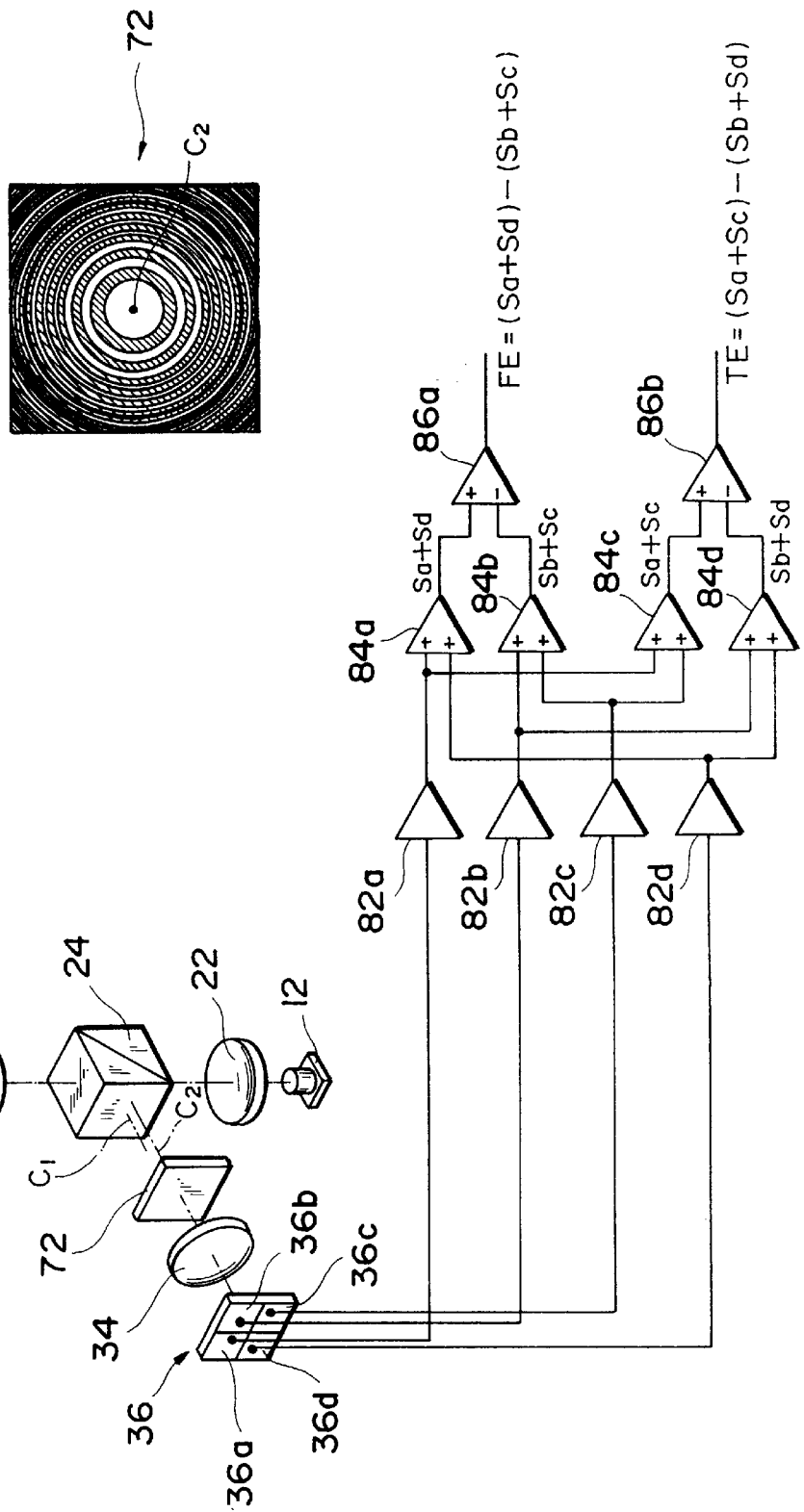

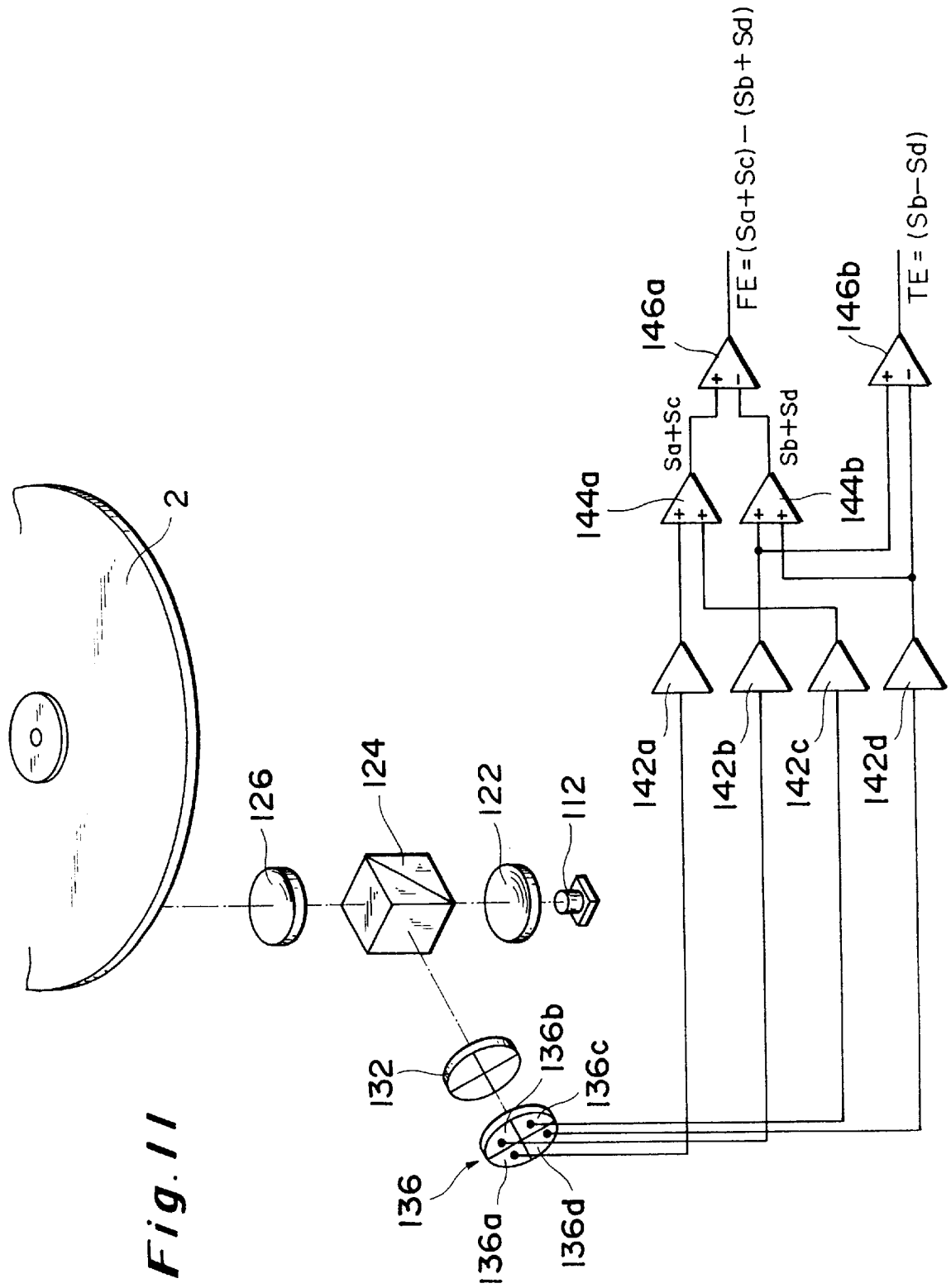

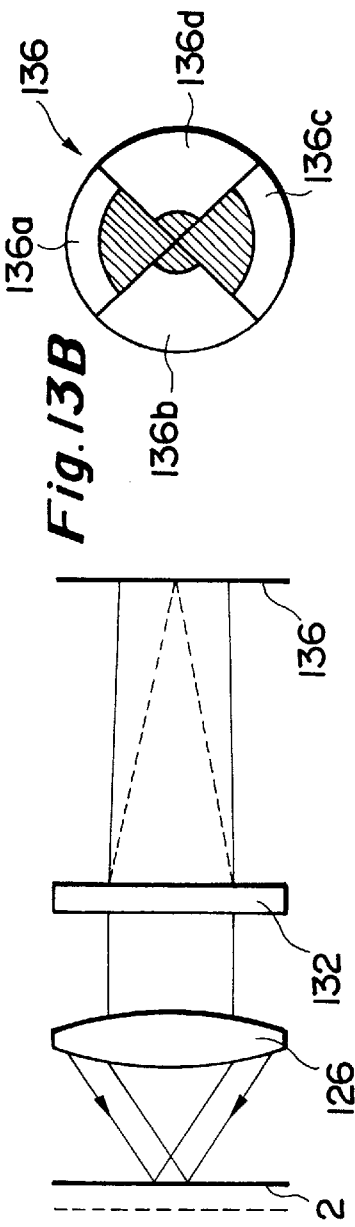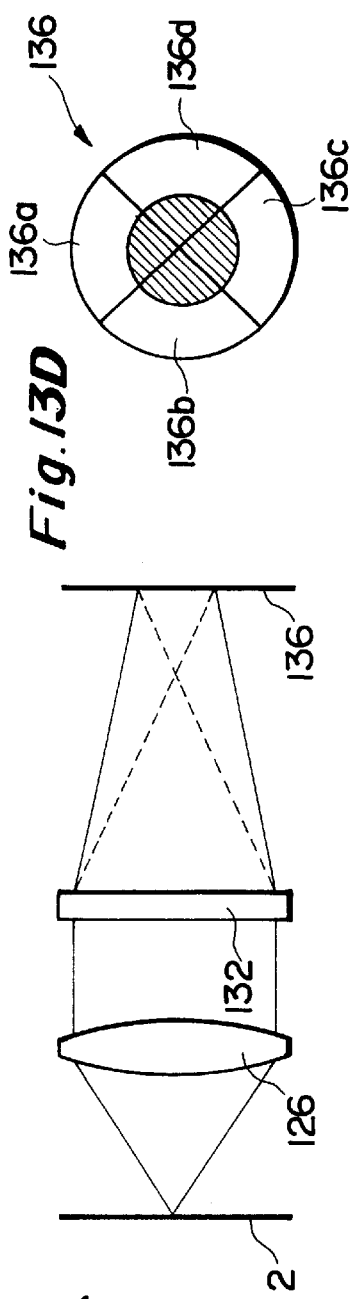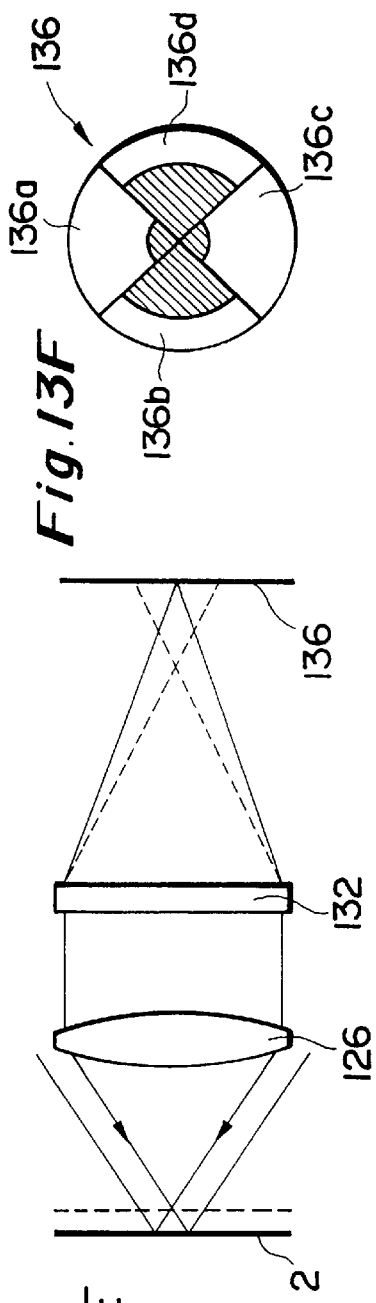

PHOTO-DETECTION DEVICE USED IN AN OPTICAL PICKUP HEAD FOR DETECTING FOCUSING ERROR SIGNAL

BACKGROUND OF THE INVENTION

1. Field of the Invention

The present invention relates to a photo-detection device for recording information on an optical disk and retrieving recorded information in an optical recording/retrieving apparatus such as a CD player, a magneto-optical disk drive, or the like.

2. Related Background Art

Along with recent development of the semiconductor laser diode techniques, a semiconductor laser diode, which is smaller in size than a gas laser, is used as a light source for an optical electronic equipment using coherent light. The semiconductor laser diode is widely used in an optical recording apparatus for recording/retrieving information on/from an optical disk using an optical pickup head.

SUMMARY OF THE INVENTION

Most optical electronic equipment use semiconductor laser diodes. The lasing wavelength of the semiconductor laser diode has temperature dependence, and the wavelength of coherent light beam emitted from the semiconductor laser diode changes depending on changes in its ambient temperature. Light emitted from the semiconductor laser diode is focused on an optical disk memory via an objective lens. Light reflected by the optical disk converges at a focal point on a photo-diode via a holographic element.

The focal point of light beam transmitted through the holographic element changes depending on the wavelength of irradiating light beam. Therefore, even when the light beam is focused on the photo-diode at a given temperature, it is defocused when the ambient temperature of the equipment changes. A photo-detection device detects any focusing error by focusing a laser light beam onto the recording layer of the optical disk, and monitoring light beam reflected by the disk surface via the holographic element. Such a device cannot accurately detect the focusing error when the ambient temperature of the equipment changes.

A device according to the present invention can accurately detect a focusing error even when the temperature of an equipment changes and the lasing wavelength of a semiconductor laser diode changes.

The device of the present invention comprises a light source, first focusing means for focusing a light beam emitted from the light source onto a predetermined track on an optical disk, light beam deflection means for deflecting the light beam reflected by the optical disk in a direction different from a direction to the light source, a holographic element for further diffracting the light beam deflected by the light beam deflection means to obtain ±1st diffracted light beams, second focusing means for focusing the ±1st diffracted light beams, and photo-detection means, arranged at a substantially middle point between the focal points of the ±1st diffracted light beams converged by the second focusing means, for detecting the ±1st diffracted light beams focused by the second focusing means, and converting the detected light beams into electrical signals. With this arrangement, since the ±1st light beams obtained by the holographic element are focused on the photo-detection means via the second focusing means, and the photo-detection means is arranged at substantially the middle point between the focal points of the ±1st diffracted light beams converged by the second focusing means, since the absolute value of the angle of the ±1st-order diffracted light beam at a given point on the holographic element is equal to that of the −1st-order diffracted light beam at the same point on the holographic element, the ±1st-order diffracted light beams are projected as symmetrical cross sections of light beam on the light-receiving surface of the photo-detection means. In addition, even when the wavelength of light beam emitted from the light source varies, only the distance between the focal points of the ±1st diffracted light beams changes, but the position of the symmetrical light cross sections of light beam does not move. For this reason, when the photo-detection means arranged at the position of the symmetrical cross sections of light beam detects the ±1st-order diffracted light beams, it can produce stable signals without being influenced by the deviation in wavelength of light emitted from the light source.

BRIEF DESCRIPTION OF THE DRAWINGS

FIG. 4 explains diffracted light beams in a detection system;

FIGS. 8A and 8B are respectively a schematic diagram and a plan view of an optical pickup head according to the third embodiment of the present invention;

FIG. 11 is a schematic diagram of a conventional optical pickup head;

FIGS. 13A to 13F are views for explaining a focusing error detection; and

DETAILED DESCRIPTION OF THE PREFERRED EMBODIMENTS

Figure 1:
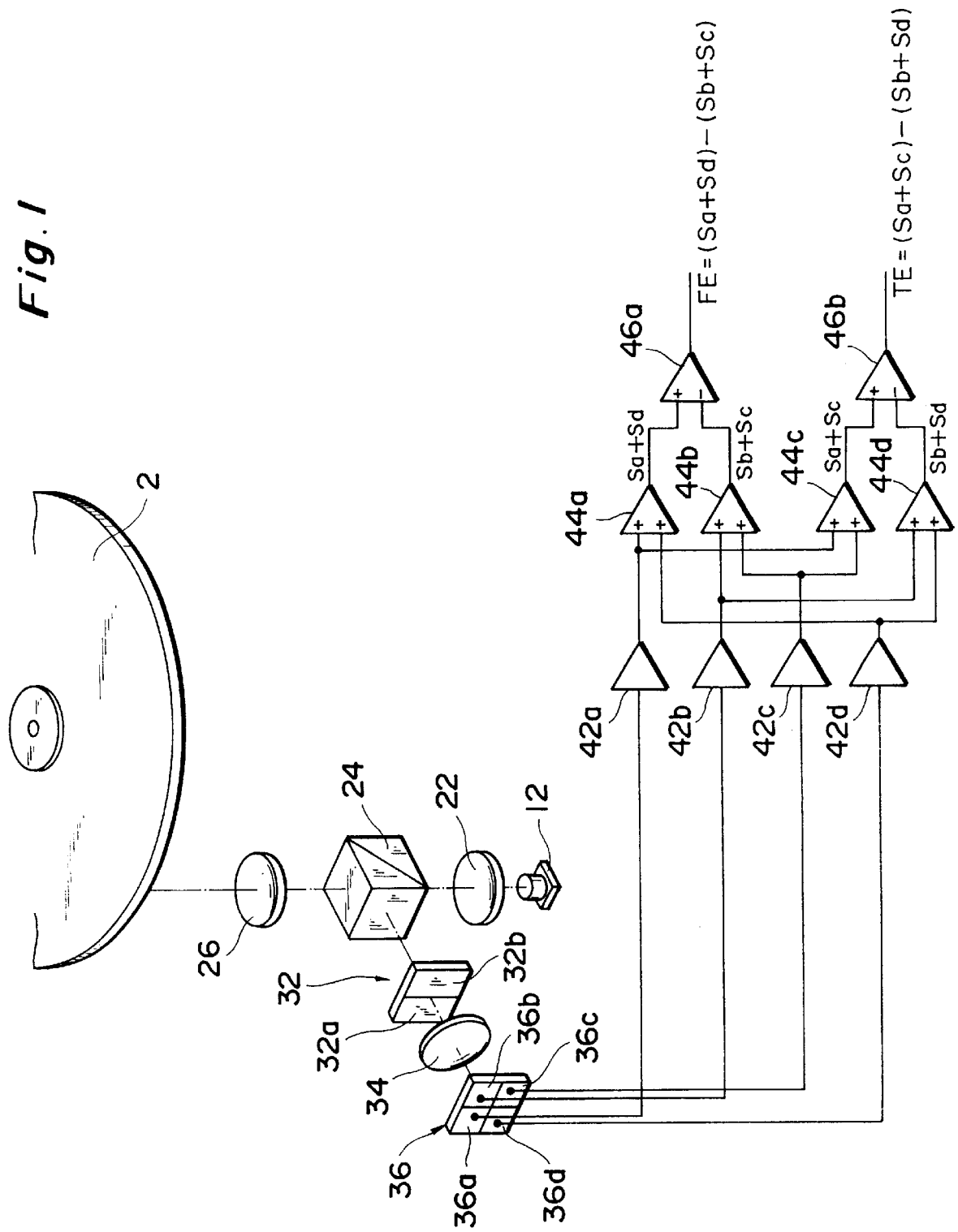
FIG. 1 is a schematic diagram of an optical pickup head according to the first embodiment of the present invention.

Prior to the description of a device according to the preferred embodiments of the present invention, how the device was achieved will be explained below with reference to FIGS. 11 to 14.

An optical pickup head is constituted of a light source, focusing means, photo-detection means, and the like, and requires many optical parts. In particular, a magneto-optical storage apparatus having not only a retrieving function but also a recording function requires a very large number of parts.

FIG. 11 is a schematic diagram of an optical pickup device manufactured so far by the present inventors. The device shown in FIG. 11 comprises a semiconductor laser diode 112 as a light source, an irradiation optical system for irradiating a light beam emitted from the semiconductor laser diode 112 onto an optical disk 2, and a detection system for detecting the light beam reflected by the optical disk 2. The irradiation optical system comprises a collimating lens 122, a light beam splitter 124, and an objective lens 126. The detection system comprises a holographic element 132, a photo-detector 136, operational amplifiers 142a, 142b, 142c, and 142d, adders 144a and 144b, and subtracters 146a and 146b. The detection system detects information recorded on the optical disk 2, and also detects tracking and focusing errors. Error signals output from the detection system are fed back to an objective lens actuator (not shown), and are used for controlling the driving operation of the objective lens 126.

Figure 12:
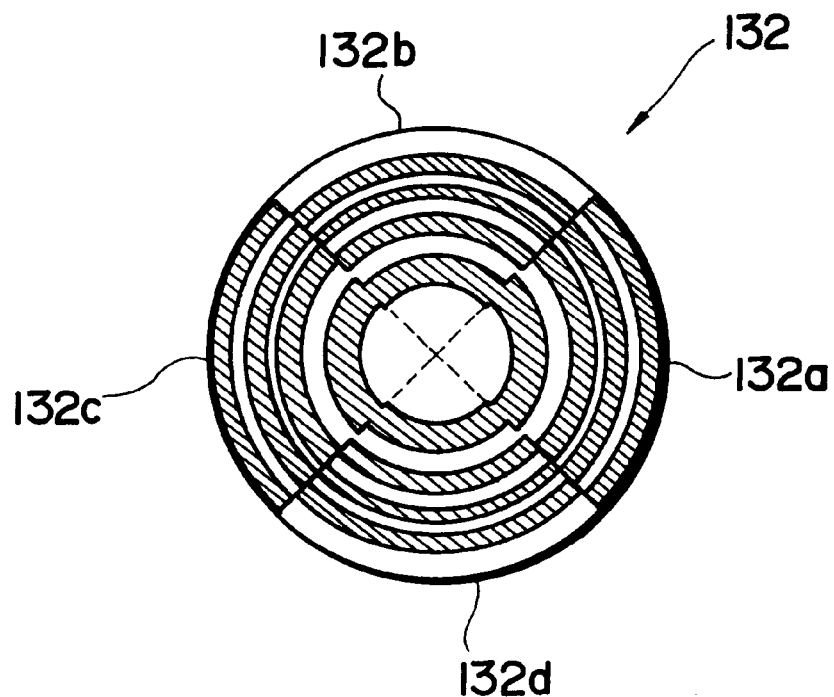
FIG. 12 is a schematic plan view of a holographic element used in the optical pickup head shown in FIG. 11.

In detection of a focusing error, an "astigmatic method" is generally used. In order to obtain astigmatism, a method of combining a convex lens and a cylindrical lens has been conventionally used. However, the cylindrical lens requires strict working precision, and is expensive. In recent years, in order to attain cost reductions, a method using a holographic has been examined, and astigmatism can be obtained by a single holographic element in this method. FIG. 12 is a schematic plan view of the holographic element 132 having an astigmatic function used in the optical pickup head shown in FIG. 11. The holographic element 132 diffracts the light beam reflected by the optical disk to converge at far and near focal points depending on the diffracting area. Each of the diffracting areas 132a, 132b, 132c, and 132d is obtained by extracting a fan shape having a central angle of 90° from a Fresnel zone plate. The holographic element 132 is divided into four diffracting areas 132a, 132b, 132c, and 132d. The diffracting areas 132a, 132b, 132c, and 132d have different ring pattern pitches, so that a diffracted light beam diffracted by the diffracting areas 132a and 132c has a focal length different from that of a diffracted light beam diffracted by the diffracting areas 132b and 132d.

The photo-detector 136 detects the intensity of diffracted light beams diffracted by the holographic element 132, and converts them into electrical signals. The photo-detector 136 has four-element light-receiving areas 136a, 136b, 136c, and 136d. The holographic element 132 and the photo-detector 136 are disposed so that the diffracting areas 132a, 132b, 132c, and 132d of the holographic element 132 respectively overlap the light-receiving areas 136a, 136b, 136c, and 136d of the photo-detector 136 when viewed along the optical axis direction of the reflected light beam. The photo-detector 136 is disposed at substantially the middle position between the two focal points of diffracted light beams diffracted by the holographic element 132.

A signal $S_a$, obtained from the light-receiving area 136a, is input to the adder 144a via the operational amplifier 142a. A signal $S_b$ obtained from the light-receiving area 136b is input to the adder 144b and the subtracter 146b via the operational amplifier 142b. A signal $S_c$ obtained from the light-receiving area 136c is input to the adder 144a via the operational amplifier 142c. A signal $S_d$ obtained from the light-receiving area 136d is input to the adder 144b and the subtracter 146b via the operational amplifier 142d. The signals output from the adders 144a and 144b are processed by the subtracter 146a, thus outputting a focusing error signal FE. The subtracter 146b outputs a tracking error signal TE. The focusing error signal FE and the tracking error signal TE are respectively given by:

$$FE=(S_a+S_c)-(S_b+S_d)$$

$$TE=(S_b-S_d)$$

A light beam emitted from the semiconductor laser diode 112 is converted into a collimating light beam by the collimating lens 122, and the collimated light beam reaches the objective lens 126 via the light beam splitter 124. The light beam is focused on a predetermined track on the optical disk 2 by the objective lens 126. The reflected light beam which is reflected by the optical disk 2 is further reflected by the light beam splitter 124, and is guided toward the detection system. The reflected light beam is diffracted by the holographic element 132, and the diffracted light beams are incident on the photo-detector 136. The diffracted light beams are received by the light-receiving areas 136a, 136b, 136c, and 136d of the photo-detector 136, and the focusing error signal and the tracking error signal are calculated on the basis of the signals obtained by the light-receiving areas 136a, 136b, 136c, and 136d. The focusing error signal FE and the tracking error signal TE are respectively given by:

$$FE=(S_a+S_c)-(S_b+S_d)$$

$$TE=(S_b-S_d)$$

FIGS. 13A to 13F are views for explaining focusing error detection. When the recording layer of the optical disk 2 is accurately located at the focal point of the objective lens 126, as shown in FIG. 13C, the diffracted light beams are projected as a circular light beam cross section at the center of the photo-detector 136, as shown in FIG. 13D. For this reason, the intensities of the detection signals $S_a$, $S_b$, $S_c$, and $S_d$ obtained from the light-receiving areas 136a, 136b, 136c, and 136d are equal to each other. Therefore, the focusing error signal FE becomes 0.

On the other hand, when the recording layer of the optical disk 2 is located in front of the focal point of the objective lens 126, as shown in FIG. 13A, the diffracted light beams are projected as larger cross fan-shaped sections on the light-receiving areas 136a and 136c and smaller fan-shaped cross sectional areas on the light-receiving portions 136b and 136d, as shown in FIG. 13B. As a result, the focusing error signal FE has a positive value.

Furthermore, when the recording layer of the optical disk 2 is located behind the focal point of the objective lens 126, as shown in FIG. 13E, the diffracted light beams are projected as smaller fan-shaped cross sectional patterns on the light-receiving areas 136a and 136c and larger fan-shaped cross sectional patterns on the light-receiving areas 136b and 136d, as shown in FIG. 13F. As a result, the focusing error signal FE has a negative value. In this manner, the focusing error signal FE changes depending on the position of the optical disk 2 with respect to the objective lens 126. Based on this focusing error signal FE, the objective lens 126 is controlled to focus the light beam on the recording layer of the optical disk 2.

Figure 14:
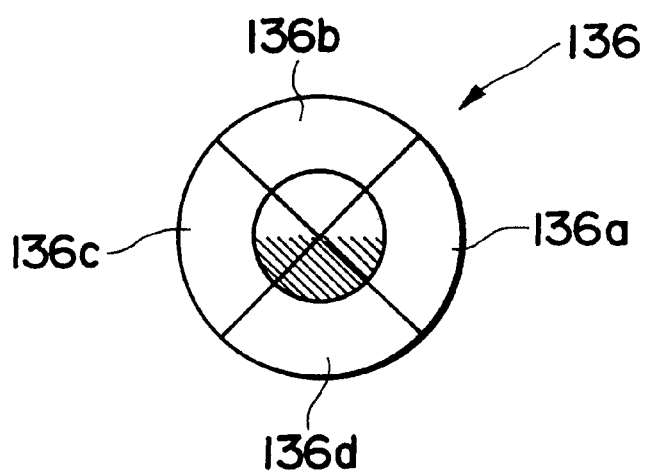
FIG. 14 is a view for explaining a tracking error.

FIG. 14 is a view for explaining tracking error detection. Assume that no focusing error occurs. When the light beam emitted from the semiconductor laser diode 112 is not focused at the center of a predetermined track on the optical disk 2, but is shifted in the radial direction of the optical disk 2, the diffracted light beams is projected on the photo-detector 136 as a sectional pattern, as shown in, e.g., FIG. 14. More precisely, the light beam cross sectional pattern is the same as that obtained in focused state shown in FIGS. 13C and 13D, and the intensities of the diffracted light beams detected from the light-receiving portions 136a and 136c are equal to one another, but the intensities of diffracted light beams detected by the light-receiving areas 136b and 136d vary depending on the tracking error. Therefore, the tracking error signal TE has a positive or negative value in correspondence with the tracking error. Based on this tracking error signal TE, the objective lens 126 is controlled, so that the light beam is precisely located on a desired track on the optical disk 2.

In an optical element such as a diffractive grating, a holographic element, or the like, which utilizes diffraction of light beam, the grating pitch is designed in correspondence with the wavelength of light beam to be used, so as to give a required diffraction angle to a diffracted light beam. However, the semiconductor laser diode used as the light source of the optical pickup head advantageously has a compact size, but its lasing wavelength undesirably varies according to the laser output or ambient temperature. For this reason, when the focusing error is detected by the astigmatic method using the holographic element 132 in the above-mentioned device, if the ambient temperature changes and the lasing wavelength of the semiconductor laser diode 112 varies, the diffracted angle of the light beams diffracted by the holographic element differs from the designed diffraction angles. Therefore, when the lasing wavelength of the semiconductor laser diode 112 varies, the diffracted light beams are not projected as a circular pattern on the photo-detector even when no focusing error occurs, thus disturbing accurate detection for focusing error.

The present invention has been made in consideration of the above situation, and has as its object to provide an optical pickup head which can accurately detect any focusing error even when the wavelength of light emitted from a light source varies.

The preferred embodiments of the present invention will be described below with reference to FIGS. 1 to 10B. The arrangement of the device according to each embodiment will be briefly explained below.

The device of the present invention comprises a light source 12, the first focusing means 26 for focusing a light beam emitted from the light source 12 on a predetermined track on an optical disk 2, light beam deflection means 24 for deflecting the light beam reflected by the optical disk 2 in a direction different from a direction to the light source, a holographic element 32 for further diffracting the light beam deflected by the light beam deflection means 24 to obtain ±1st diffracted light beams, second focusing means 34 for focusing the ±1st-order diffracted light beams, and photo-detection means 36, arranged at substantially the middle point between the focal points of the ±1st-order diffracted light beams converged by the second focusing means 34, for detecting the ±1st-order diffracted light beams focused by the second focusing means 34, and converting them into electrical signals. With this arrangement, the ±1st-order diffracted light beams obtained from the holographic element 32 are focused on the photo-detection means 36 via the second focusing means 34, and the photo-detection means 36 is arranged at substantially the middle point between the focal points of the ±1st diffracted light beams converged by the second focusing means 34. For this reason, since the absolute value of the diffraction angle of the ±1st-order diffracted light beam at a given point on the holographic element 32 is equal to that of the −1st-order diffracted light beam at the same point on the holographic element 32, the ±1st-order diffracted light beams are projected as symmetrical cross sections of light beam on the light-receiving surface of the photo-detection means 36. In addition, even when the wavelength of light emitted from the light source varies, only the focal points of the ±1st-order diffracted light beams change, but the position of the symmetrical cross sections of light beam does not move. For this reason, when the photo-detection means 36 arranged at the position of the symmetrical cross sectional patterns of light beam detects the ±1st-order diffracted light beams, it can produce a stable signal without being influenced by the deviation in wavelength of light emitted from the light source 12.

The device of the present invention is characterized by detecting a focusing error on the basis of the electrical signals output from the photo-detection means 36. With this arrangement, since the focusing error is detected on the basis of the signals output from the photo-detection means, the focusing error can be accurately detected.

The holographic element of the device of the present invention is characterized by comprising a diffracting area using a Fresnel zone plate, and a light-shading area for shading the light beam reflected by the optical disk. With this arrangement, since the holographic element comprises the diffracting area using a Fresnel zone plate and the light-shading area for shading the light beam reflected by the optical disk, the focusing error can be easily detected.

The holographic element of the device of the present invention is characterized by comprising a diffracting area using a Fresnel zone plate, a light-shading portion for shading the light beam reflected by the optical disk, and two transmitting areas for transmitting the light beam reflected by the optical disk, and in that the diffracting area, the light-shading area, and the two transmitting areas are formed as a diagonal pair. With this arrangement, since the holographic element comprises the diffracting area using a Fresnel zone plate, the light-shading area for shading the light beam reflected by the optical disk, and the two transmitting areas for transmitting the light beam reflected by the optical disk, and the diffracting area, the light-shading area, and the two transmitting areas are formed as a diagonal pair, the focusing error can be easily detected. Since the transmitting areas are arranged, the area of the light-shading area can be reduced, thus reducing light energy loss.

The holographic element of the device of the present invention is characterized by comprising a Fresnel zone plate, and in that the holographic element, the second focusing means, and the photo-detection means are disposed, so that the optical axis of the Fresnel zone plate, the second focusing means, and the photo-detection means, are slightly shifted from the optical axis of the first focusing means, which is deflected by the light beam deflection means. With this arrangement, since the holographic element comprises the Fresnel zone plate, and the holographic element, the second focusing means, and the photo-detection means are disposed, so that the optical axis of the Fresnel zone plate, the second focusing means, and the photo-detection means, the focusing error can be easily detected, are slightly shifted from the optical axis of the first focusing means, which is deflected by the light beam deflection means. Since no light-shading area is formed on the holographic element, light energy loss can be eliminated.

The holographic element of the device of the present invention is characterized by comprising a Rayleigh-Wood type Fresnel zone plate having transparent square wave shaped cross sectional ring patterns are alternately formed. With this arrangement, since the holographic element comprises a Rayleigh-Wood type Fresnel zone plate on which transparent three-dimensional ring patterns are alternately arranged, the focusing error can be easily detected. Since all the ring patterns are transparent, the light anergy loss can be further reduced.

The photo-detection means 36 of the device of the present invention is characterized by comprising four-elements light-receiving areas. With this arrangement, since the photo-detection means comprises the four-elements light-receiving areas, the focusing error can be accurately detected.

The first embodiment of the present invention will be described in more detail below with reference to the accompanying drawings.

Figure 2:
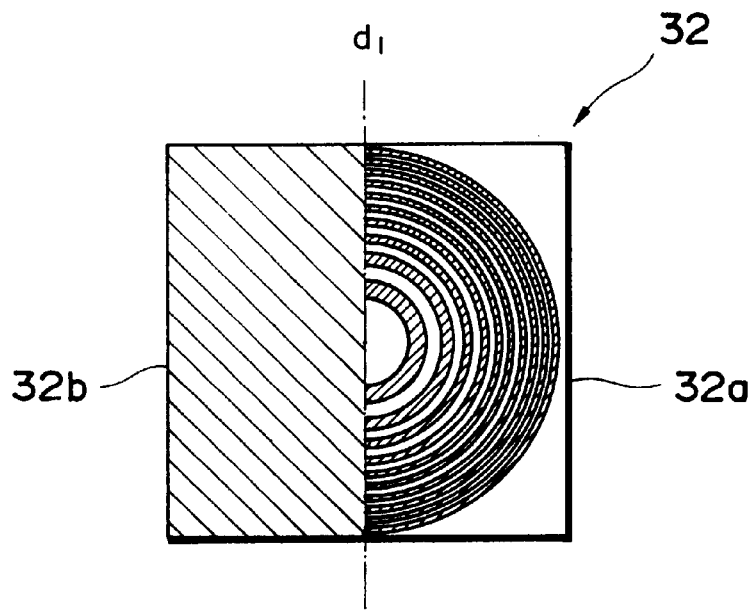
FIG. 2 is a schematic plan view of a holographic element used in the optical pickup head shown in FIG. 1.
Figure 3:
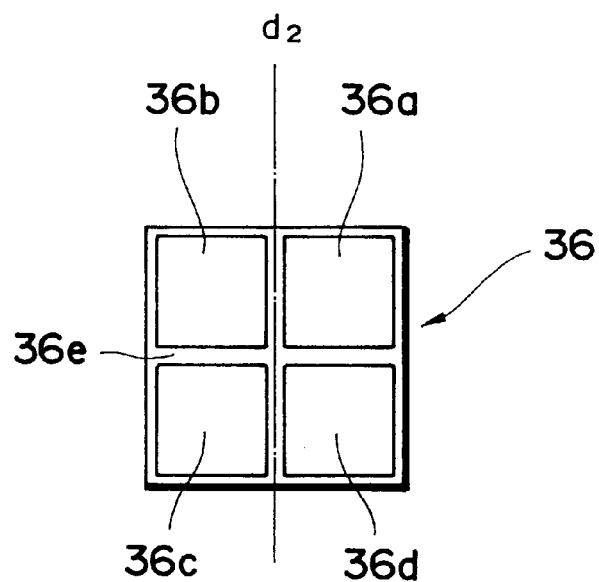
FIG. 3 is a schematic plan view of a photo-detector used in the optical pickup head shown in FIG. 1.

FIG. 1 is a schematic diagram of an optical pickup head according to the first embodiment of the present invention, FIG. 2 is a schematic plan view of a holographic element used in the optical pickup head, and FIG. 3 is a schematic plan view of a photo-detector used in the optical pickup head.

The optical pickup head shown in FIG. 1 comprises a semiconductor laser diode 12 as a light source, an irradiation optical system for irradiating a light beam emitted from the semiconductor laser diode 12 onto an optical disk 2, and a detection system for detecting the light beam reflected by the optical disk 2. The irradiation optical system comprises a collimating lens 22, a light beam splitter 24 serving as the light beam deflection means, and an objective lens 26 serving as the first focusing means. The detection system comprises a holographic element 32, a convex lens 34 serving as the second focusing means, a photo-detector 36 serving as the photo-detection means, operational amplifiers 42a, 42b, 42c, and 42d, adders 44a, 44b, 44c, and 44d, and subtracters 46a and 46b.

The collimating lens 22 converts a light beam emitted from the semiconductor laser diode 12 into a collimated light beam with a predetermined effective diameter. The light beam splitter 24 deflects and splits the light beam which is emitted from the semiconductor laser diode 12 and is incident on the optical disk 2, and the reflected light beam reflected by the optical disk 2.

The objective lens 26 focuses the light beam emitted from the semiconductor laser diode 12 on a predetermined track on the optical disk 2, and is supported by an objective lens actuator (not shown). The objective lens actuator controls the position of the objective lens 26 in the track and focusing directions, so that the focused light beam spot always traces the predetermined track.

The detection system has a recorded information detection system and an error detection system. The error detection system includes a focusing error detection system for detecting a focusing error, and a tracking error detection system for detecting a tracking error. The recorded information detection system detects the intensity, polarization state, and the like of the reflected light beam reflected by the optical disk 2 in accordance with the recording type of the optical disk 2, thereby reading out information recorded on the optical disk 2. Note that FIG. 1 shows only the error detection system.

As shown in FIG. 2, the holographic element 32 has a diffracting area 32a using a Fresnel zone plate on which semi-circular transparent and opaque ring patterns are alternately arranged, and a light-shading area 32b for shading the reflected light beam. The diffracting area 32a splits the reflected light beam reflected by the optical disk 2 into ±1st-order diffracted light beams. When the recording layer of the optical disk 2 is accurately located at the focal point of the objective lens 26, the diffracting area 32a is designed to output light beams at predetermined diffraction angles ±hθ in proportion to a distance h from the optical axis on the holographic element. The ±1st-order diffracted light beams generated by the diffracting area 32a are diffracted light beams which respectively propagate in the directions of the angles ±hθ, and are utilized in the detection of a focusing error and a tracking error. Note that the light-shading area 32b may comprise, e.g., a reflection mirror or the like.

The convex lens 34 focuses the diffracted light beams diffracted by the holographic element 32. The photo-detector 36 detects the intensities of diffracted light beams focused by the convex lens 34, and converts them into electrical signals. The photo-detector 36 has four-element light-receiving areas 36a, 36b, 36c, and 36d. As shown in FIG. 3, an insensitive zone 36e at which no intensities of diffracted light beams are detected is formed on the boundary area of the light-receiving areas 36a, 36b, 36c, and 36d. The photo-detector 36 is located at substantially the middle point between the focal points of the ±1st-order diffracted light beams by the convex lens 34 when the recording layer of the optical disk 2 is accurately located at the focal point of the objective lens 26.

The holographic element 32 is disposed, so that a dividing line d, for boundary of the diffracting area 32a and the light-shading area 32b is perpendicular to the track direction of the optical disk 2 when viewed along the optical axis direction. The holographic element 32 and the photo-detector 36 are disposed, so that a dividing line $d_2$ for dividing the light-receiving areas 36a and 36b and the light-receiving areas 36c and 36d overlaps the dividing line $d_1$ of the holographic element 32 when viewed along the optical axis direction.

A signal $S_a$ obtained from the light-receiving area 36a is input to the adders 44a and 44c via the operational amplifier 42a. A signal $S_b$ obtained from the light-receiving area 36b is input to the adders 44b and 44d via the operational amplifier 42b. A signal $S_c$ obtained from the light-receiving area 36c is input to the adders 44b and 44c via the operational amplifier 42c. A signal $S_d$ obtained from the light-receiving area 36d is input to the adders 44a and 44d via the operational amplifier 42d. The signals output from the adders 44a and 44b are processed by the subtracter 46a, thus outputting a focusing error signal FE. The signals output from the adders 44c and 44d are processed by the subtracter 46b, thus outputting a tracking error signal TE. The focusing error signal FE and the tracking error signal TE are respectively given by:

$$FE=(S_a+S_d)-(S_b+S_c) \quad (1)$$

$$TE=(S_a+S_c)-(S_b+S_d) \quad (2)$$

The operation of the optical pickup head according to the first embodiment will be described below.

A light beam emitted from the semiconductor laser diode 12 is collimated into a light beam having a predetermined effective diameter by the collimating lens 22, and the collimated light beam is incident on the objective lens 26 via the light beam splitter 24. The light beam transmitted through the objective lens 26 is focused on a predetermined track on the optical disk 2, and is reflected by the optical disk 2. The reflected light beam returns along the same optical path as described above, and is deflected toward the detection system by the light beam splitter 24. The reflected light beam deflected to the detection system is diffracted by the holographic element 32.

FIGS. 4(a) to 4(h) are views for explaining the diffracted light beams in the detection system. In FIG. 4(a), a solid line represents the ±1st-order diffracted light beam, a dotted line represents the −1st-order diffracted light beam, and an alternate long and short dashed line represents the optical axis. FIGS. 4(b) to 4(h) show cross sections of light beam at the respective positions when they are viewed in a direction from the holographic element 32 to the convex lens 34 side along the optical axis direction. Assume that the light reflected by the optical disk 2 and incident on the holographic element 32 has a circular cross section, as shown in FIG. 4(b). The left half part of the reflected light beam is shaded by the light-shading area 32b of the holographic element 32, and the right half part of the reflected light beam is diffracted by the diffracting area 32a to be split into ±1st-order diffracted light beams having a semi-circular light beam cross section. When the recording layer of the optical disk 2 is accurately located at the focal point of the objective lens 26, the ±1st-order diffracted light beam converges to get closer to the optical axis at the diffraction angle +hθ and the −1st-order diffracted light beam diverges away from the optical axis at the diffraction angle −hθ, in proportion to the distance h from the optical axis on the diffracting area 32a. At the position of the convex lens 34, a semi-circular light beam cross section of the +1st-order diffracted light beam is smaller in size than that of light beam incident on the holographic element 32, as shown in FIG. 4(c), and a semi-circular light beam cross section of the −1st-order diffracted light beam is larger in size than that of light beam incident on the holographic element 32, as shown in FIG. 4(f). The convex lens 34 focuses these ±1st-order diffracted light beams so that they get closer to the optical axis. At a focal point $P_1$ of the ±1st-order diffracted light beam, the ±1st-order diffracted light beam is focused at substantially one point, as shown in FIG. 4(d), the −1st-order diffracted light beam is not focused at one point but has a semi-circular light beam cross section smaller in size than that incident on the convex lens 34, as shown in FIG. 4(g). Furthermore, at a focal point $P_2$ of the −1st-order diffracted light beam laid farther than the focal point $P_1$ of the ±1st-order diffracted light beam, the −1st-order diffracted light beam is focused at substantially one point, as shown in FIG. 4(h). At this time, since the ±1st-order diffracted light beam propagates to diverge from the focal point $P_1$ after it passes through the focal point $P_1$, it propagates to the left side where the light-shading area 32b of the holographic element 32 is present, and a semi-circular light beam cross section of the ±1st-order diffracted light beams is larger in size than that of the −1st-order diffracted light beam, as shown in FIG. 4(e).

At a substantially middle point $P_0$ between the focal points $P_1$ and $P_2$ of the ±1st-order diffracted light beams, the sizes of the cross sections of the ±1st-order diffracted light beams are equal to each other. In addition, the flux of the ±1st-order diffracted light beam is located at the left half side where the light-shading area 32b of the holographic element 32 is present, and the −1st-order diffracted light beam is located at the right half side where the Fresnel zone plate 32a of the holographic element 32 is present. For these reasons, upon combination of the −1st diffracted light beams, a diffracted flux of the light beam having a circular cross section is obtained. The circular diffracted flux of the light beam is called a circle of least confusion, and the middle point $P_0$ where the circle of least confusion is obtained, is called the position of the circle of least confusion.

In this manner, the ±1st-order diffracted light beams diffracted by the holographic element 32 are focused by the convex lens 34, and are received by the light-receiving areas 36a, 36b, 36c, and 36d of the photo-detector 36 arranged at the position of the circle of least confusion. Based on the signals obtained from the light-receiving areas 36a, 36b, 36c, and 36d, the focusing error signal and the tracking error signals are calculated.

Figure 5A:
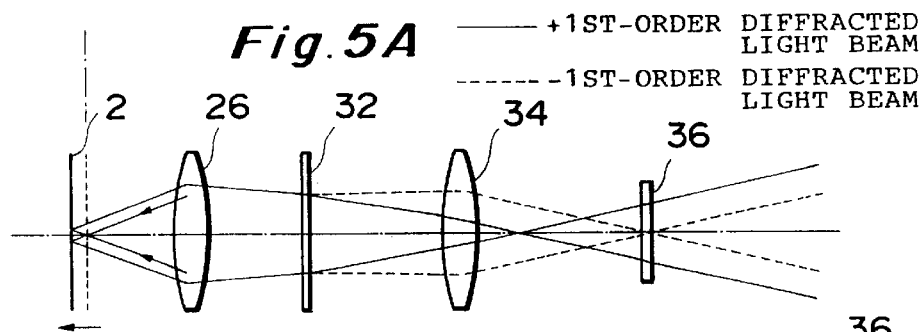
FIGS. 5A to 5F are views for explaining a focusing error detection.
Figure 5B:
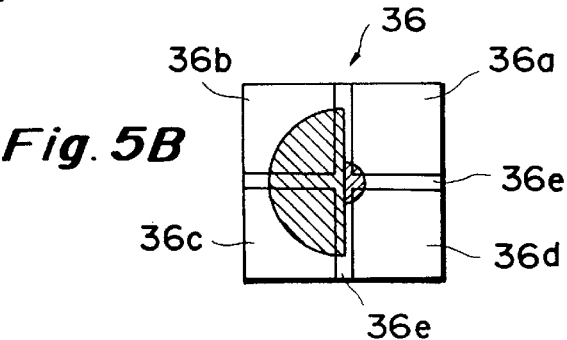
Figure 5C:
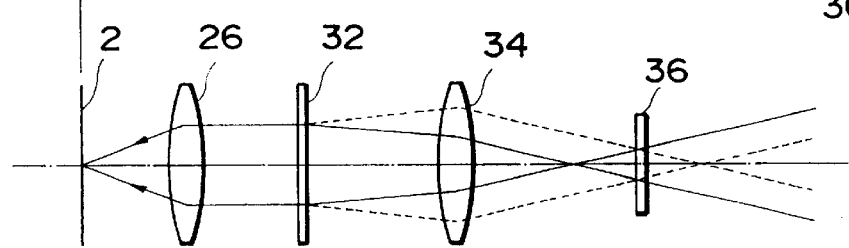
Figure 5D:
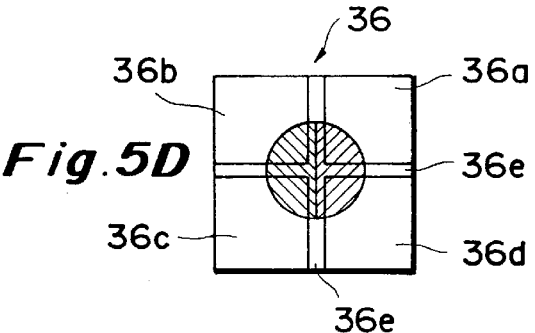

FIGS. 5A to 5F are views for explaining focusing error detection. When the recording layer of the optical disk 2 is accurately located at the focal point of the objective lens 26, and no focusing error occurs, as shown in FIG. 5C, the diffracted light beam as a combination of the ±1st-order diffracted light beams is projected as a circular light beam cross section at the center of the photo-detector 36, as shown in FIG. 5D. For this reason, the signal intensities $S_a$, $S_b$, $S_c$, and $S_d$ obtained from the light-receiving areas 36a, 36b, 36c, and 36d are equal to each other, and the focusing error signal FE given by equation (1) becomes zero.

On the other hand, when the recording layer of the optical disk 2 is located behind the focal point of the objective lens 26, as shown in FIG. 5A, the light beam reflected by the optical disk 2 converges after it is transmitted through the objective lens 26, and the focal points $P_1$ and $P_2$ of the ±1st-order diffracted light beams move closer to the convex lens 34 as is compared to the state of focus shown in FIG. 5D, as shown in FIG. 5B. For this reason, the ±1st-order diffracted light beam is projected as a larger semi-circular pattern in size on the light-receiving areas 36b and 36c, and the −1st-order diffracted light beam is projected as a smaller semi-circular pattern in size on the light-receiving areas 36a and 36d. At this time, since the insensitive zone 36e which detects no intensities of light beams is formed on the boundary of the adjacent light-receiving areas 36a, 36b, 36c, and 36d to each other, most light energy flux of the −1st-order diffracted light beam fall within the insensitive zone 36e. For this reason, the signal intensities $S_a$ and $S_d$ obtained from the light-receiving areas 36a and 36d become smaller than the signal intensities $S_b$ and $S_c$ obtained from the light-receiving areas 36b and 36c, and the focusing error signal FE given by equation (1) has a negative value.

Figure 5E:
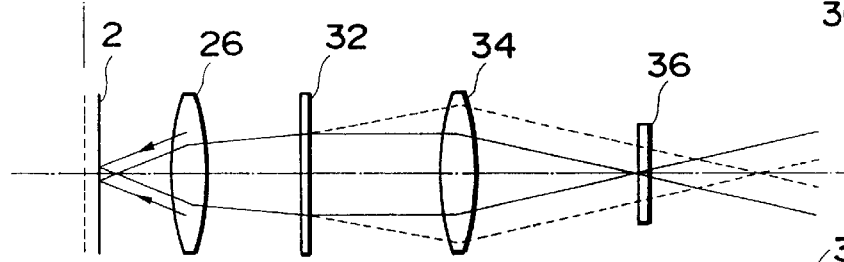
Figure 5F:
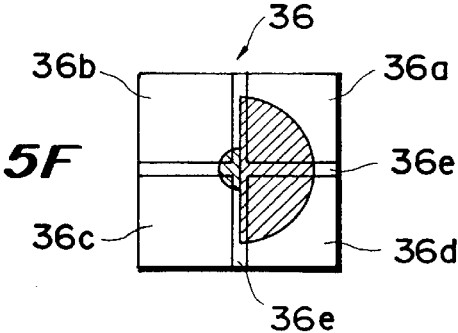

Furthermore, when the recording layer of the optical disk 2 is located in front of the focal point of the objective lens 26, as shown in FIG. 5E, the light beam reflected by the optical disk 2 diverges after it is transmitted through the objective lens 26, and the focal points $P_1$ and $P_2$ of the ±1st-order diffracted light beams moves away from the convex lens 34 as compared to the state of focus shown in FIG. 5D, as shown in FIG. 5F. For this reason, the ±1st-order diffracted light beam is projected as a smaller semi-circular pattern in size on the light-receiving areas 36b and 36c, and the −1st-order diffracted light beam is projected as a larger semi-circular pattern in size on the light-receiving areas 36a and 36d. As a result, the signal intensities $S_a$ and $S_d$ obtained from the light-receiving areas 36a and 36d become larger than the signal intensities $S_b$ and $S_c$ obtained from the light-receiving areas 36b and 36c, and the focusing error signal FE given by equation (1) has a positive value. By feeding back the focusing error signal FE output from the detection system to the objective lens actuator, the objective lens 26 is controlled so that a light beam is focused on the recording layer of the optical disk 2.

Tracking error detection will be described below. Assume that no focusing error occurs. When the light beam emitted from the semiconductor laser diode 12 is not focused at the center of a track on the optical disk 2, and is shifted in the radial direction of the optical disk 2, the intensity of the reflected light beam decreases. In addition, in the first embodiment, since the holographic element 32 is disposed so that the dividing line $d_1$ between the diffracting area 32a and the light-shading area 32b is perpendicular to the track direction of the optical disk 2 when viewed along the optical axis direction, if the light beam emitted from the semiconductor laser diode 12 is shifted from a predetermined track on the optical disk 2 toward the inner area of the optical disk 2 in the radial direction, the diffracted light beams diffracted by the holographic element 32 is projected as a circular light beam cross section at the center of the photo-detector 36, but the light intensity received on the light-receiving areas 36a and 36c are lower than the light intensity received on the light-receiving areas 36b and 36d.

For this reason, the signal intensities $S_a$ and $S_c$ obtained from the light-receiving areas 36a and 36c are smaller than the signal intensities $S_b$ and $S_d$ obtained from the light-receiving areas 36b and 36d, and the tracking error signal TE given by equation (2) has a negative value. On the contrary, if the light beam emitted from the semiconductor laser diode 12 is shifted from a predetermined track on the optical disk 2 toward the outer area of the optical disk 2 in the radial direction, the diffracted light beams is projected as a circular light beam cross section at the center of the photo-detector 36, but the light intensity received on the light-receiving areas 36a and 36c is a higher than light intensity received on the light-receiving areas 36b and 36d. For this reason, the signal intensities $S_a$ and $S_c$ obtained from the light-receiving areas 36a and 36c become larger than the signal intensities $S_b$ and $S_d$ obtained from the light-receiving areas 36b and 36d, and the tracking error signal TE given by equation (2) has a positive value. By feeding back the tracking error signal TE output from the detection system to the objective lens actuator, the objective lens 26 is controlled, so that the light beam emitted from the semiconductor laser diode 12 is accurately focused on the predetermined track on the optical disk 2.

Figure 6A:
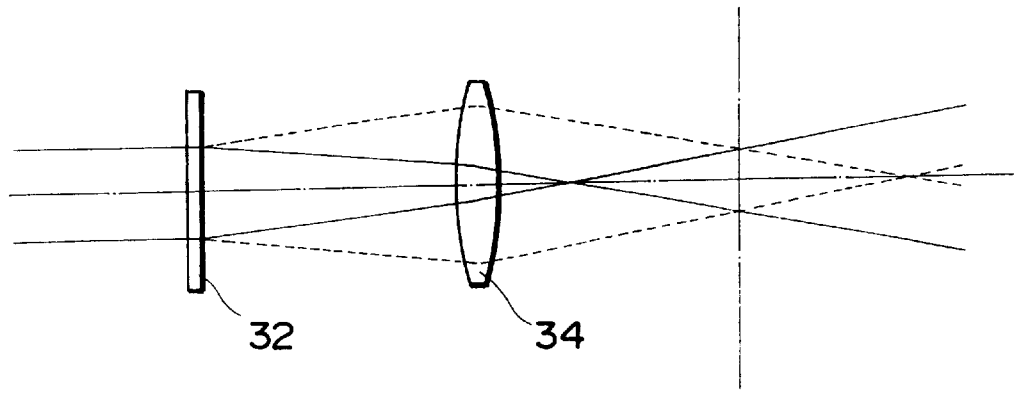
FIGS. 6A to 6C are views for explaining diffracted light beams in the detection system upon deviation in lasing wavelength of a semiconductor laser diode.
Figure 6B:
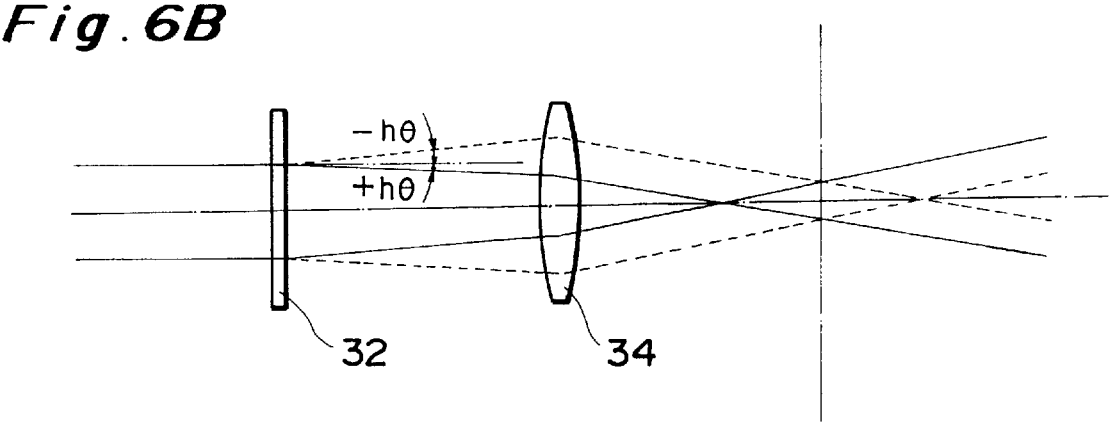
Figure 6C:
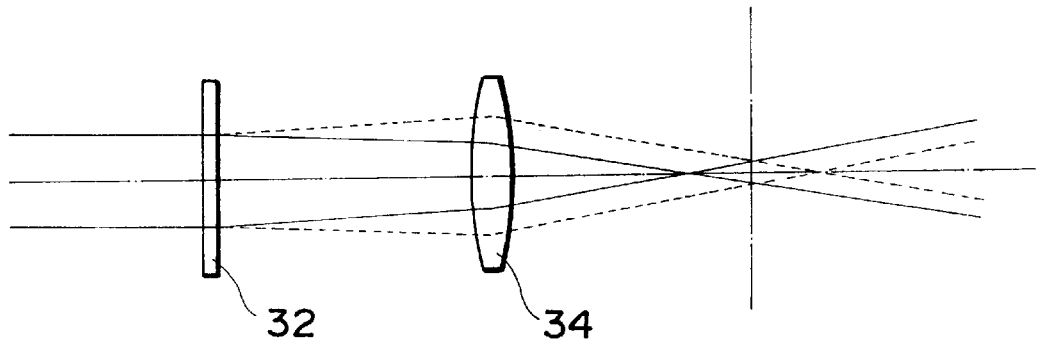

The lasing wavelength of the semiconductor laser diode has dependence of the ambient temperature. FIGS. 6A to 6C are views for explaining the diffracted light beams in the detection system when the lasing wavelength of the semiconductor laser diode changes. Assume that neither a focusing error nor tracking error occurs. FIG. 6B shows a case wherein a light beam having a required wavelength is emitted from the semiconductor laser diode 12. The photo-detector 36 is disposed at the position of the circle of least confusion of the diffracted light beam obtained in this case. When the ambient temperature changes, the lasing wavelength of the semiconductor laser diode 12 changes, and the diffraction angles of the diffracted light beams increase, as shown in FIG. 6A, or the diffraction angles of the diffracted light beams decrease, as shown in FIG. 6C.

However, in these cases, since the absolute value of the diffraction angle +hθ of the ±1st-order diffracted light beam at a given point on the diffracting area 32a of the holographic element 32, which point lies in the distance h from the optical axis, is equal to that of the diffraction angle −hθ of the −1st-order diffracted light beam, even when the lasing wavelength of the semiconductor laser diode 12 changes, the position of the circle of least confusion does not move and is always constant, although the distance between the focal points of the ±1st-order diffracted light beams changes.

As described above, in the optical pickup head of the first embodiment, the ±1st-order diffracted light beams obtained from the holographic element are focused on the photo-detector via the convex lens, and the photo-detector is disposed at the position of the circle of least confusion as substantially the middle point between the focal points of the ±1st-order diffracted light beams obtained when the recording layer of the optical disk is accurately located at the focal point of the objective lens. For this reason, since the diffraction angle of the +1st-order diffracted light beam at a given point on the holographic element is equal to that of the −1st-order diffracted light beam at the same point on the holographic element, the ±1st-order diffracted light beams form symmetrical light beam cross sections at the position of the circle of least confusion. In addition, even when the lasing wavelength of the semiconductor laser diode varies, the position of the circle of least confusion does not move although the distance between the focal points of the ±1st-order diffracted light beams changes.

For this reason, when no focusing error occurs, the diffracted light beam as a combination of the ±1st-order diffracted light beams always are projected as a circular light beam cross section on the photo-detector without being influenced by the deviation in lasing wavelength of the semiconductor laser diode. Therefore, the photo-detector can obtain stable signals, and hence, can detect the focusing error when it has occurred.

Figure 7:
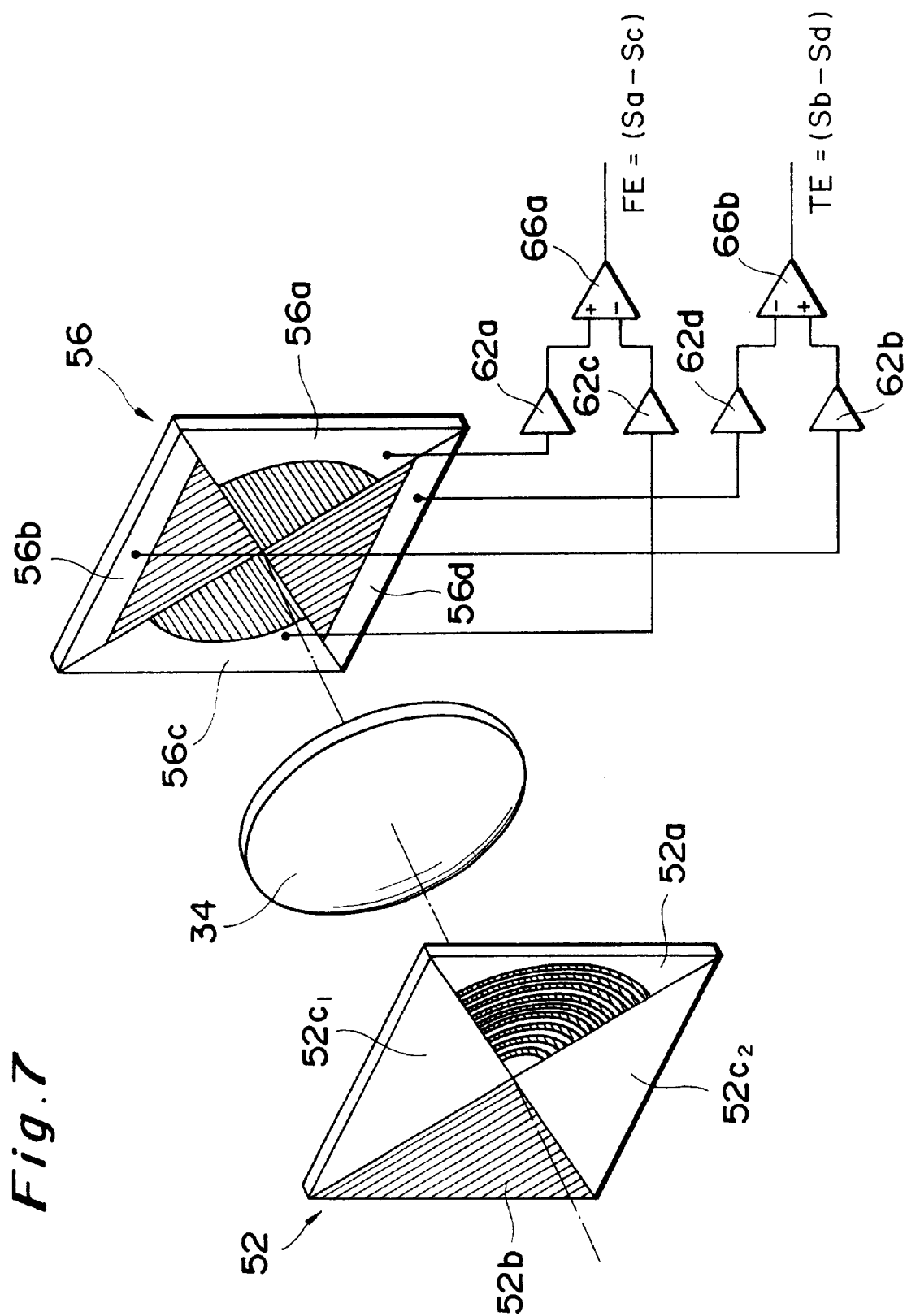
FIG. 7 is a schematic diagram of an optical pickup head according to the second embodiment of the present invention.

The second embodiment of the present invention will be described below with reference to the accompanying drawings. FIG. 7 is a schematic diagram of a detection system of an optical pickup head according to the second embodiment of the present invention. Note that the same reference numerals in the optical pickup head of the second embodiment denote the same parts as that of the first embodiment, and a detailed description thereof will be omitted.

As shown in FIG. 7, the detection system of the optical pickup head of the second embodiment comprises a holographic element 52, a convex lens 34, a photo-detector 56, operational amplifiers 62a, 62b, 62c, and 62d, and subtracters 66a and 66b. The photo-detector 56 has four-elements light-receiving areas 56a, 56b, 56c, and 56d.

The holographic element 52 has a fan-shaped diffracting area 52a using a Fresnel zone plate, a light-shading area 52b for shading the light beam reflected by the optical disk 2, and two transmitting areas $52c_1$ and $52c_2$ for transmitting the reflected light beam. The diffracting area 52a, the light-shading area 52b, and the two transmitting areas $52c_1$ and $52c_2$ are respectively formed at opposing positions. The diffracting area 52a, the transmitting area $52c_1$, the light-shading area 52b, and the transmitting area $52c_2$ are disposed to respectively overlap the light-receiving areas 56a, 56b, 56c, and 56d of the photo-detector 56 when viewed along the optical axis direction. The photo-detector 56 is disposed at substantially the middle point between the focal points of ±1st-order diffracted light beams formed by the convex lens 34 when the recording layer of the optical disk 2 is accurately located at the focal point of the objective lens 26.

A signal intensity $S_a$ obtained from the light-receiving area 56a is output to the subtracter 66a via the operational amplifier 62a, a signal intensity $S_c$ obtained from the light-receiving area 56c is output to the subtracter 66a via the operational amplifier 62c, and these signals are processed by the subtracter 66a, thus outputting a focusing error signal FE. On the other hand, a signal intensity $S_b$ obtained from the light-receiving area 56b is output to the subtracter 66b via the operational amplifier 62b, a signal intensity $S_d$ obtained from the light-receiving area 56d is output to the subtracter 66b via the operational amplifier 62d, and these signals are processed by the subtracter 66b, thus outputting a tracking error signal TE. The focusing error signal FE and the tracking error signal TE are respectively given by:

$$FE = (S_a - S_c) \quad (3)$$

$$TE = (S_b - S_d) \quad (4)$$

The focusing error is detected using the ±1st-order diffracted light beams diffracted by the diffracting area 52a as in the first embodiment. The ±1st-order diffracted light beams are focused on the photo-detector 56 by the convex lens 34, and are detected by the light-receiving areas 56a and 56c. Based on the signal intensities $S_a$ and $S_c$ obtained from the light-receiving areas 56a and 56c, the focusing error signal FE given by equation (3) is calculated. In the second embodiment, the tracking error is detected using transmitted light beams, which are neither diffracted nor shielded but are transmitted through the transmitting areas $52c_1$ and $52c_2$ of the holographic element 52.

The transmitted light beams are focused on the photo-detector 56 by the convex lens 34, and are detected by the light-receiving areas 56b and 56d. Based on the signal intensities $S_b$ and $S_d$ obtained from the light-receiving areas 56b and 56d, the tracking error signal TE given by equation (4) is calculated.

In the optical pickup head of the second embodiment, as in the first embodiment, the ±1st diffracted light beams obtained from the holographic element are focused on the photo-detector via the convex lens, and the photo-detector is disposed at substantially the middle point between the focal points of the ±1st diffracted light beams is formed by the convex lens when the recording layer of the optical disk is accurately located at the focal point of the objective lens. For this reason, since the angle of diffraction of the +1st-order diffracted light beam at a given point on the holographic element is equal to that of the −1st-order diffracted light beam at the same point on the holographic element, the ±1st-order diffracted light beams are projected as a symmetrical light beam cross section at the middle point. In addition, even when the lasing wavelength of the semiconductor laser diode changes, the middle point does not move although the distance between the focal points of the ±1st-order diffracted light beams changes.

For this reason, since the photo-detector can produce stable signals without being influenced by the deviation in lasing wavelength of the semiconductor laser diode, the focusing error can be accurately detected. In the optical pickup head of the second embodiment, since the area of the light-shading area of the holographic element can be smaller than that in the first embodiment, light energy loss can be reduced.

Figure 9A:
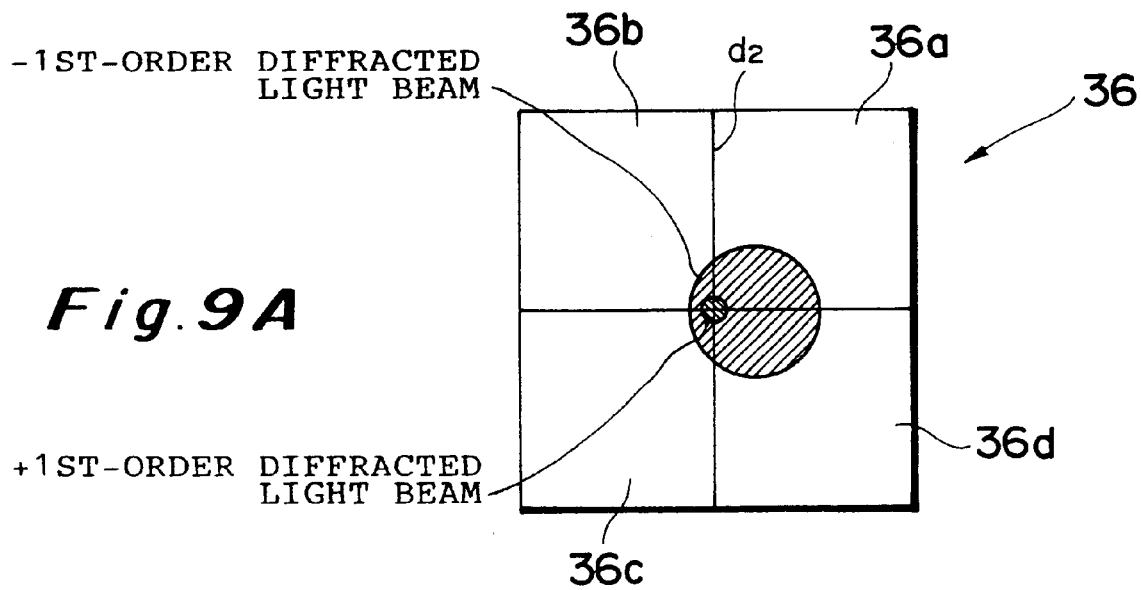
FIGS. 9A to 9C are views for explaining a focusing error detection.
Figure 9B:
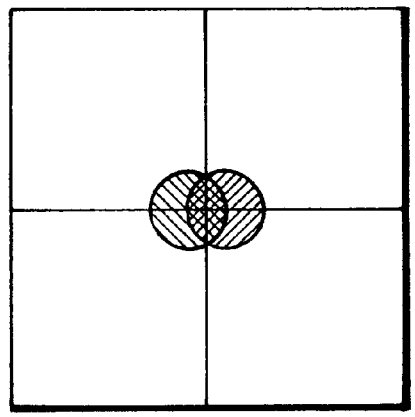
Figure 9C:
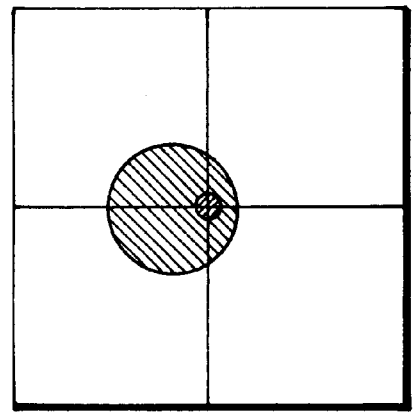

The third embodiment of the present invention will be described below with reference to the accompanying drawings. FIGS. 8A and 8B are respectively a schematic diagram and a plan view of a detection system of an optical pickup head according to the third embodiment of the present invention, and FIGS. 9A to 9C are schematic plan views of a holographic element used in the optical pickup head. Note that the same reference numerals in the optical pickup head of the third embodiment denote the same parts as that in the first embodiment, and a detailed description thereof will be omitted.

As shown in FIG. 8A, the detection system of the optical pickup head of the third embodiment comprises a holographic element 72, a convex lens 34, a photo-detector 36 having four-element light-receiving areas 36a, 36b, 36c, and 36d, operational amplifiers 82a, 82b, 82c, and 82d respectively connected to the light-receiving areas 36a, 36b, 36c, and 36d, adders 84a, 84b, 84c, and 84d, and subtracters 86a and 86b.

As shown in FIG. 8B, the holographic element 72 comprises a Fresnel zone plate. The optical axis, $C_2$, of the holographic element 72, the convex lens 34, and the photo-detector 36 is slightly shifted from the optical axis, $C_1$, of the objective lens 26, which is deflected by the light beam splitter 24. In the first and second embodiments, a light-shading area is formed on the holographic element, but in the third embodiment, no light-shading area is formed. For this reason, the light beam incident on the holographic element 72 can be effectively diffracted into ±1st-order diffracted light beams.

The holographic element 72, the convex lens 34, and the photo-detector 36 are disposed, so that their optical axes coincide with the optical axis $C_2$. The optical axis $C_2$ is slightly shifted from the optical axis $C_1$ of the objective lens 26, which is deflected by the light beam splitter 24. The photo-detector 36 is disposed at a substantially middle point between the focal points of the ±1st-order diffracted light beams formed by the convex lens 34 when the recording layer of the optical disk 2 is accurately located at the focal point of the objective lens 26.

As shown in FIG. 8A, a signal intensity $S_a$ obtained from the light-receiving area 36a is output to the adders 84a and 84c via the operational amplifier 82a. A signal intensity $S_b$ obtained from the light-receiving area 36b is output to the adders 84b and 84d via the operational amplifier 82b. A signal intensity $S_c$ obtained from the light-receiving area 36c is output to the adders 84b and 84c via the operational amplifier 82c. A signal intensity $S_d$ obtained from the light-receiving area 36d is output to the adders 84a and 84d via the operational amplifier 82d. The signal intensities output from the adders 84a and 84b are processed by the subtracter 86a, thus outputting a focusing error signal FE. The signal intensities output from the adders 84c and 84d are processed by the subtracter 86b, thus outputting a tracking error signal TE. The focusing error signal FE and the tracking error signal TE are respectively given by:

$$FE=(S_a+S_d)-(S_b+S_c) \tag{5}$$

$$TE=(S_a+S_c)-(S_b+S_d) \tag{6}$$

The optical axis $C_1$ of the light beam reflected by the optical disk 2 passing through the objective lens 26 is deflected by the light beam splitter 24, and the deflected light beam is incident on the holographic element 72 on the optical axis $C_2$, which is slightly shifted from the optical axis $C_1$. The light beam is diffracted into ±1st-order diffracted light beams by the holographic element 72. When the recording layer of the optical disk 2 is accurately located at the focal point of the objective lens 26, since the optical axis $C_2$ is slightly shifted from the optical axis $C_1$, the +1st-order diffracted light beam is obliquely focused on the optical axis $C_2$, and the −1st-order diffracted light beam diverges to get away from the optical axis $C_2$ passing through the center of the Fresnel zone plate. Since the convex lens 34 is disposed so that its central axis coincides with the optical axis $C_2$, the ±1st-order diffracted light beams are focused on two different points on the optical axis $C_2$, and are detected by the photo-detector 36.

FIGS. 9A to 9C are views for explaining focusing error detection. In the third embodiment, the photo-detector 36 is disposed so that its optical axis coincides with the optical axis $C_2$, and is disposed at substantially the middle point between the focal points of the ±1st-order diffracted light beams. For this reason, the light beam cross section formed by the ±1st-order diffracted light beams on the photo-detector 36 change in correspondence with the focusing error, as shown in FIGS. 9A to 9C.

When the recording layer of the optical disk 2 is accurately located at the focal point of the objective lens 26, and no focusing error occurs, the diffracted light beam as a combination of the ±1st-order diffracted light beams are projected as circular cross sections being symmetrical about a dividing line $d_2$ on the photo-detector 36, as shown in FIG.

9B. For this reason, the signal intensities $S_a$, $S_b$, $S_c$, and $S_d$ obtained from the light-receiving areas 36a, 36b, 36c, and 36d are equal to each other, and the focusing error signal FE given by equation (5) becomes zero.

On the other hand, when the recording layer of the optical disk 2 is located behind the focal point of the objective lens 26, and the focal point of the +1st-order diffracted light beam is located on the dividing line $d_2$ of the photo-detector 36, as shown in FIG. 9A, the −1st-order diffracted light beam is projected as a large circular light beam cross section which moves to the light-receiving areas 36a and 36d. For this reason, the signal intensities $S_a$ and $S_d$ obtained from the light-receiving areas 36a and 36d are larger than the signal intensities $S_b$ and $S_c$ obtained from the light-receiving areas 36b and 36c, and the focusing error signal FE given by equation (5) has a positive value.

Furthermore, when the recording layer of the optical disk 2 is located in front of the focal point of the objective lens 26, and the focal point of the −1st-order diffracted light beam is located on the dividing line $d_2$ of the photo-detector 36, as shown in FIG. 9C, the +1st-order diffracted light beam is projected as a large circular light beam cross section which moves to the light-receiving areas 36b and 36c. For this reason, the signal intensities $S_a$ and $S_d$ obtained from the light-receiving areas 36a and 36d are smaller than the signal intensities $S_b$ and $S_c$ obtained from the light-receiving areas 36b and 36c, and the focusing error signal FE given by equation (5) has a negative value. Based on the signal intensities $S_a$, $S_b$, $S_c$, and $S_d$ obtained by the light-receiving areas 36a, 36b, 36c, and 36d in this manner, the focusing error signal FE is calculated.

On the other hand, the tracking error is detected by detecting the difference between the intensities of diffracted light beams on the light-receiving areas 36a and 36c and the light-receiving areas 36b and 36d, as in the first embodiment. More specifically, the tracking error signal TE given by equation (6) is calculated based on the signal intensities $S_a$, $S_b$, $S_c$, and $S_d$ obtained from the light-receiving areas 36a, 36b, 36c, and 36d. Since this operation is the same as that in the first embodiment, a detailed description thereof will be omitted.

In the optical pickup head of the third embodiment, the ±1st-order diffracted light beams obtained by the holographic element are focused on the photo-detector via the convex lens, and the photo-detector is disposed at substantially the middle point between the focal points of the ±1st-order diffracted light beams converged the convex lens when the recording layer of the optical disk is accurately located at the focal point of the objective lens. For this reason, as in the second embodiment, since the photo-detector can produce stable signals without being influenced by the deviation in lasing wavelength of the semiconductor laser diode, the focusing error can be detected accurately. In the optical pickup head of the third embodiment, since no light-shading area is formed on the holographic element, and the light beam reflected by the optical disk can be further effectively diffracted by the holographic element, the light energy loss can be reduced.

Figure 10A:
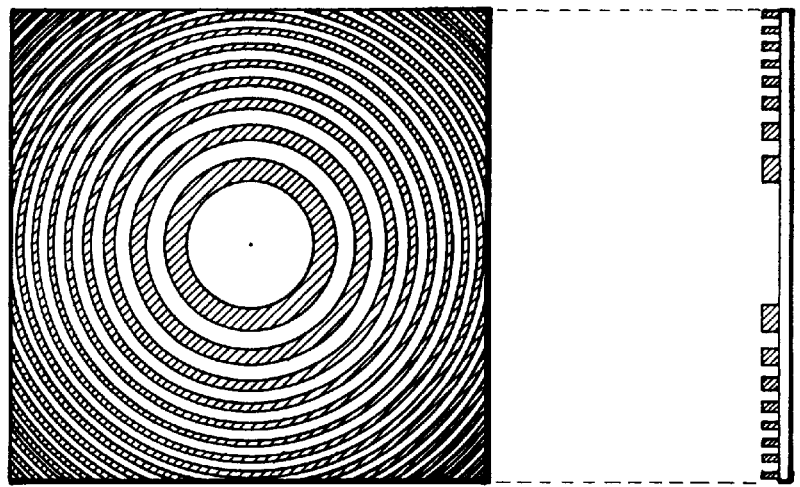
FIGS. 10A and 10B are views showing a holographic element used in the optical pickup head according to the present invention.
Figure 10B:
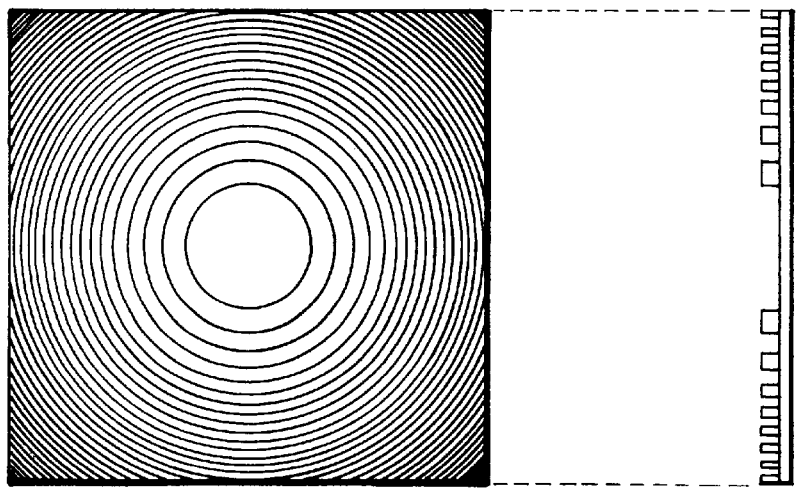

Note that the present invention is not limited to the above-mentioned particular embodiments, and various modifications may be made within the scope of the invention. For example, the holographic element may comprise a Fresnel zone plate on which transparent and opaque rings are alternately formed, as shown in FIG. 10A, or may comprise a Rayleigh-Wood type Fresnel zone plate on which transparent rings with squared wave shaped cross section are alternately formed, as shown in FIG. 10B.

As described above, in the device according to each of the above embodiments, the ±1st-order diffracted light beams obtained from the holographic element are focused on the photo-detection means via the second focusing means, and the photo-detection means is disposed at substantially the middle point between the focal points of the ±1st-order diffracted light beams converged by the second focusing means when the recording layer of the optical disk coincides with the focal point of the first focusing means. For this reason, since the absolute value of the diffraction angle of the ±1st-order diffracted light beam at a given point on the holographic element is equal to that of the −1st-order diffracted light beam at the same point on the holographic element, the ±1st-order diffracted light beams form symmetrical light beam cross section at the middle point. In addition, even when the wavelength of light emitted from the light source changes, the distance between the focal points of the ±1st-order diffracted light beams changes, but the middle point does not move. Therefore, when the photo-detection means disposed at the middle point detects the ±1st-order diffracted light beams, an optical pickup head which can produce stable signals using the photo-detection means without being influenced by the deviation in wavelength of light emitted from the light source can be provided.

The device according to each of the above embodiments can provide an optical pickup head which can accurately detect a focusing error by detecting the focusing error on the basis of signals output from the photo-detection means.

The device according to each of the above embodiments can provide an optical pickup head, which can easily detect a focusing error when it uses a holographic element comprising a diffracting area using a Fresnel zone plate, and a light-shading area for shading the light beam reflected by the optical disk.

The device according to each of the above embodiments can provide an optical pickup head, which can easily detect a focusing error when it uses a holographic element comprising a diffracting area using a Fresnel zone plate, a light-shading area for shading the light beam reflected by the optical disk, and two transmitting areas for transmitting the light beam reflected by the optical disk, the diffracting area, the light-shading area, and the two transmitting areas are formed as a diagonal pair, and which can reduce light energy loss since the pair of the light-shading area can be reduced to be smaller than that in the invention of claim 3.

The device according to each of the above embodiments can provide an optical pickup head, which can easily detect a focusing error when it uses a holographic element comprising a Fresnel zone plate, and the Fresnel zone plate, the second focusing means, and the photo-detection means are disposed on an optical axis slightly shifted from the optical axis of the first focusing means, which is deflected by the light beam deflection means, and which can effectively utilize light since no light-shading area is formed.

The device according to each of the above embodiments can provide an optical pickup head, which can further effectively utilize light energy when it uses a holographic element comprising a Rayleigh-Wood type Fresnel zone plate on which transparent rings with squared wave shaped cross section are alternately formed.

The device according to each of the above embodiments can provide an optical pickup head, which can accurately detect a focusing error when it uses photo-detection means having four-element light-receiving areas.

Note that Patent application No. 126771/1994 (6126771) filed on May 16, 1994 in Japan serving as the basis of the present invention will be quoted here.

What is claimed is:

1. A photo-detection device comprising:

a light source;

first focusing means for focusing a light beam emitted from said light source onto a predetermined track on an optical disk;

light beam deflection means for deflecting the light beam reflected by the optical disk in a direction different from a direction to said light source;

a diffractive element for further diffracting the light beam deflected by said light beam deflection means to produce plus and minus 1st order diffracted light beams;

second focusing means for focusing the plus and minus 1st order diffracted light beams; and photo-detection means, disposed at a substantially middle point between focal points of the plus and minus 1st order diffracted light beams converged by said second focusing means, for detecting the plus and minus 1st order diffracted light beams converged by said second focusing means, and converting the detected light beams into electrical signals;

wherein said diffractive element comprises a diffracting area using a Fresnel Zone Plate, a light-shading area for shading the light beam reflected by the optical disk, and two transmitting areas for transmitting the light beam reflected by the optical disk, and said diffracting area, said light-shading area, and said two transmitting areas being formed as a diagonal pair.

2. A photo-detection device comprising:

a light source;

first focusing means for focusing a light beam emitted from said light source onto a predetermined track on an optical disk;

light beam deflection means for deflecting the light beam reflected by the optical disk in a direction different from a direction to said light source;

a diffractive element for further diffracting the light beam deflected by said light beam deflection means to produce plus and minus 1st order diffracted light beams;

second focusing means for focusing the plus and minus 1st order diffracted light beams; and photo-detection means, disposed at a substantially middle point between focal points of the plus and minus 1st order diffracted light beams converged by said second focusing means, for detecting the plus and minus 1st order diffracted light beams converged by said second focusing means, and converting the detected light beams into electrical signals, wherein said diffractive element comprises a Fresnel Zone Plate, and said diffractive element, said second focusing means, and said photo-detection means are disposed so that an optical axis of said first focusing means and said photodetection means is slightly shifted from an optical axis of said first focusing means, which is deflected by said light deflection means.

3. A device for detecting a reflected light beam reflected by an optical disk, comprising:

a diffractive element for diffracting the reflected light beam to obtain plus and minus 1st order diffracted light beams;

a condensing lens for focusing the plus and minus 1st order diffracted light beams of the reflected light beam transmitted through said diffractive element; and a photo-detector which is arranged at a position between focal points of the plus and minus 1st order diffracted light focused by said condensing lens;

wherein said diffractive element comprises a diffracting area for diffracting the reflected light beam transmitted through said diffractive element, a light-shading area for shading the reflected light beam, a first transmitting area for transmitting the reflected light beam, and a second transmitting area for transmitting the reflected light beam, said diffracting area neighbors said first transmitting area, said first transmitting area neighbors said light-shading area, said light-shading area neighbors said second transmitting area, and said second transmitting area neighbors said diffracting area.

* * * * *